No. 780,607. PATENTED JAN. 24, 1905.
C. R. HARRIS.
FILTER.
APPLICATION FILED MAY 10, 1904.

WITNESSES
E. D. Nottingham
G. F. Downing

INVENTOR
C. R. Harris
By H. A. Seymour
Attorney

No. 780,607. Patented January 24, 1905.

UNITED STATES PATENT OFFICE.

CHARLES R. HARRIS, OF LOS ANGELES, CALIFORNIA, ASSIGNOR TO THE AMERICAN PERCOLATOR COMPANY, OF LOS ANGELES, CALIFORNIA.

FILTER.

SPECIFICATION forming part of Letters Patent No. 780,607, dated January 24, 1905.

Application filed May 10, 1904. Serial No. 207,250.

*To all whom it may concern:*

Be it known that I, CHARLES R. HARRIS, a resident of Los Angeles, in the county of Los Angeles and State of California, have invented certain new and useful Improvements in Filters; and I do hereby declare the following to be a full, clear, and exact description of the invention, such as will enable others skilled in the art to which it appertains to make and use the same.

My invention relates to an improved filter, and more particularly to an improvement upon the construction of filter disclosed in Patent No. 700,916, granted to me May 27, 1902, the object of the invention being to provide improved means for catching the mud and heavier impurities of the water, relieving the filtering mechanism proper of such excess, and which means can be readily removed, cleaned, and replaced without disturbing the filter proper.

With this object in view the invention consists in certain novel features of construction and combinations and arrangements of parts, as will be more fully hereinafter described, and pointed out in the claims.

Figure 1:
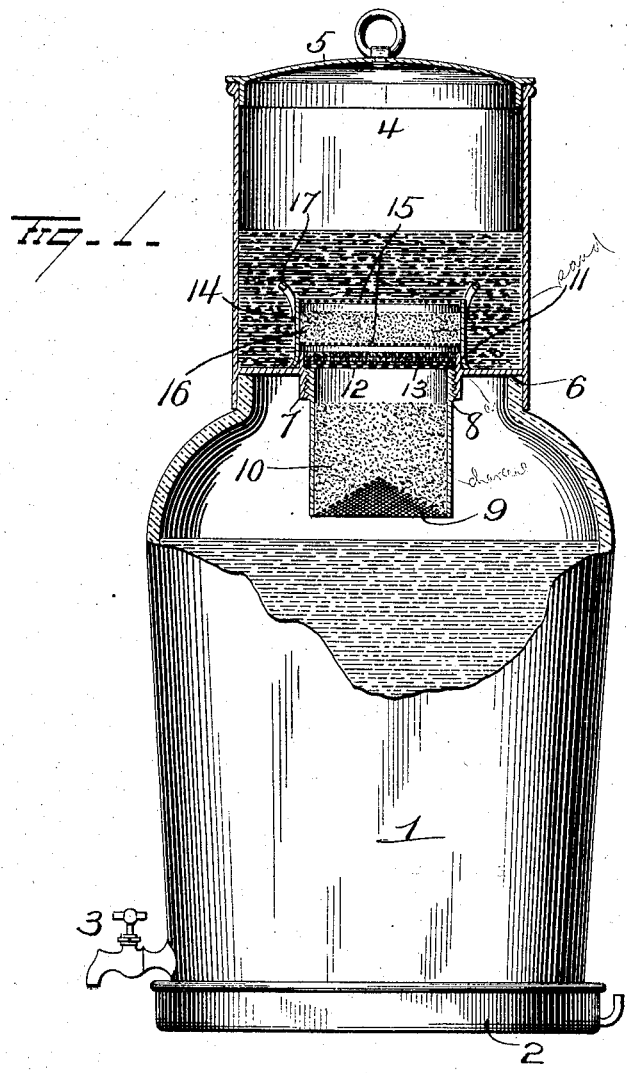
Figure 2:
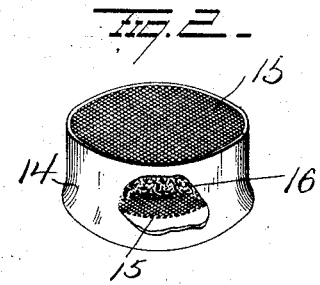

In the accompanying drawings, Figure 1 is a view in longitudinal section, illustrating my improvements; and Fig. 2 is a view of the cleaner removed.

1 represents the receptacle for filtered water, preferably supported in a drip-pan 2 and provided with a spigot 3. The upper end of receptacle 1 is preferably contracted to receive the inclosing lower end of a filtering-chamber 4, closed by any approved cover 5. The bottom 6 of filter-chamber 4 is provided with a central opening and a depending internally-screw-threaded ring 7 around the same to receive a threaded sleeve 8, having a conical screen 9 of fine wire-mesh in its bottom to prevent the escape of sand and animal charcoal or other like filtering material 10 and also, owing to the conical shape of the screen, prevent packing of the filtering material. Around the central opening in bottom 6 is an upwardly-projecting flange 11, forming a receptacle to receive a screen 12 and a series of asbestos disks 13 thereon, through which the water must pass.

To remove mud and the heavier foreign matter from the water and relieve the filter proper from the same, I provide cleaner 14, which comprises a cylindrical ring flared at its lower end and adapted to inclose the flange 11 and rest on bottom 6. In this ring 14 wire screens 15 are provided, spaced apart and containing a filter of sand 16 between them, through which the water must pass and be partially cleaned before contact with asbestos disks 13. The cleaner 14 may be provided with suitable handles 17, if desired, as shown in Fig. 1, to facilitate its removal and can be readily removed from time to time and cleaned by inserting the same upside down beneath a faucet of running water and the mud and other matter washed from the sand. This cleaner adds to the life of the filter and is a valuable addition thereto.

Slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a filter, the combination with a receptacle for containing filtered water and a receptacle for unfiltered water above the same, of a filter carried by said upper receptacle and through which the water must pass, and a cleaner located within and carried by said upper receptacle above the filter and removable bodily therefrom, substantially as set forth.

2. In a filter the combination with a main receptacle for containing filtered water, of a receptacle removably mounted upon said main receptable, a filter carried by and depending from said removable receptacle and depending into the main receptacle, and a cleaner within said removable receptacle and above the filter and removable bodily therefrom.

3. In a filter, the combination with a main receptacle open at its top, of a receptacle for unfiltered water, seated upon said main receptacle and having an opening in its bottom, a filter within and depending below said opening, and a cleaner for covering the upper end of the filter and removable bodily therefrom.

4. In a filter, the combination with a receptacle for filtered water, and a receptacle for unfiltered water above the same, of a sleeve screwed into an opening in the bottom of said upper receptacle and containing filtering material, an upwardly-projecting flange around said opening, asbestos disks in said flange, and a cleaner, comprising a flared ring around the flange, resting on the bottom, and having sand therein located between screens of fine wire mesh.

In testimony whereof I have signed my name to this specification in the presence of two subscribing witnesses.

CHAS. R. HARRIS

Witnesses:
   F. J. McClary,
   M. L. Cushing.